US009588785B2

(12) United States Patent
McGee et al.

(10) Patent No.: US 9,588,785 B2
(45) Date of Patent: Mar. 7, 2017

(54) GENERAL PROPERTY HIERARCHY SYSTEMS AND METHODS FOR WEB APPLICATIONS

(71) Applicant: AOL Inc., Dulles, VA (US)

(72) Inventors: Brendan J. McGee, Dublin (IE); Jay Trevor McFarland, Brambleton, VA (US)

(73) Assignee: AOL Inc., Dulles, VA (US)

( * ) Notice: Subject to any disclaimer, the term of this patent is extended or adjusted under 35 U.S.C. 154(b) by 666 days.

(21) Appl. No.: 14/046,740

(22) Filed: Oct. 4, 2013

(65) Prior Publication Data

US 2015/0100600 A1    Apr. 9, 2015

(51) Int. Cl.
 G06F 7/00  (2006.01)
 G06F 17/00 (2006.01)
 G06F 9/445 (2006.01)

(52) U.S. Cl.
 CPC ................ *G06F 9/44505* (2013.01)

(58) Field of Classification Search
 CPC .................................... G06F 9/44505
 See application file for complete search history.

(56) References Cited

U.S. PATENT DOCUMENTS

2002/0194263 A1* 12/2002 Murren .............. G06F 8/10
 709/203

* cited by examiner

*Primary Examiner* — Taelor Kim
(74) *Attorney, Agent, or Firm* — Bookoff McAndrews, PLLC (57) ABSTRACT

Systems and methods are disclosed for configuring a web application based on a general property hierarchy. An application property scheme including one or more property hierarchy levels may be generated based on values within a system configuration file. Each level defines configuration values for various properties associated with the web application. A property retrieval subsystem of the general property hierarchy may be used to look up configuration values from the appropriate hierarchy level(s) of the application property scheme in order to configure one or more properties of the web application during its execution. The values in the system configuration file may be changed and the changes may be reflected dynamically in the application property scheme without substantial interruption to the execution of the web application.

19 Claims, 7 Drawing Sheets

| RESOLVER KEYS | PROPERTY KEYS | PROPERTY VALUES |
|---|---|---|
| BR:BR1 | SAMPLE.PROPERTY.KEY.1 | PROPVALUE 11 |
| BR:BR2 | SAMPLE.PROPERTY.KEY.1 | PROPVALUE 12 |
| CO:US | SAMPLE.PROPERTY.KEY.2 | PROPVALUE US |
| CO:GB | SAMPLE.PROPERTY.KEY.2 | PROPVALUE GB |
| PA:SP1 | SAMPLE.PROPERTY.KEY.3 | PROPVALUE 31 |
| PA:SP2 | SAMPLE.PROPERTY.KEY.3 | PROPVALUE 32 |
| BR-PA:BR1_SP1 | SAMPLE.PROPERTY.KEY.1 | PROPVALUE 41 |
| BR-PA:BR2_SP2 | SAMPLE.PROPERTY.KEY.1 | PROPVALUE 42 |

GENERAL PROPERTY HIERARCHY SYSTEMS AND METHODS FOR WEB APPLICATIONS

TECHNICAL FIELD

The present disclosure relates generally to systems and methods for configuring web applications and, more particularly, to configuring properties of a web application.

BACKGROUND

A web application may be adapted to deliver a user experience that is customized based on a variety of target parameters. Such target parameters may include, for example, a country or other geographic region, language, or type of computing device associated with a user of the web application. In some instances, a wide range of such delivery targets may need to be serviced by a single platform or global instance of the web application system. For example, a web application system may need to manage relatively large combinations of various target parameters for purposes of internationalization and localization. Such a system may include a multitude of properties that need to be configured for different target users. Such properties may be configured based on configuration options that specify the most appropriate target language or other visual branding to use for each incoming user request as well as tailoring the set of application features exposed to the target user.

However, existing systems for internationalization and localization use property systems that have fixed/static hierarchy levels for specifying configuring application properties (e.g., language, country or other localization parameters). Existing systems also limit the number of hierarchy levels that can be defined. Consequently, such conventional systems cannot adequately handle relatively large numbers of parameter combinations needed to support a wide range of delivery targets.

SUMMARY OF THE DISCLOSURE

Embodiments disclose systems and methods for configuring a web application based on a general property hierarchy. According to certain embodiments, one computer-implemented method for configuring a web application based on a general property hierarchy, includes: obtaining a system configuration file via a network; generating an application property scheme having one or more property hierarchy levels for configuring a web application during execution of the web application, based on the obtained system configuration file, the system configuration file defining configuration values for a plurality of properties at each of the one or more property hierarchy levels of the application property scheme; responsive to receiving a request for a configuration value associated with at least one of the plurality of properties, identifying request attributes related to at least one of the one or more property hierarchy levels based on the received request; iteratively searching for the configuration value at each of the one or more property hierarchy levels of the generated application property scheme based on the identified attributes for the request; and sending a response including the configuration value based on the search.

According to certain embodiments, systems are disclosed for configuring a web application based on a general property hierarchy. One system includes a memory having processor-readable instructions stored therein; and a processor configured to access the memory and execute the processor-readable instructions, which when executed by the processor configures the processor to perform a plurality of functions, including functions to: obtain a system configuration file via a network; generate an application property scheme having one or more property hierarchy levels for configuring a web application during execution of the web application, based on the obtained system configuration file, the system configuration file defining configuration values for a plurality of properties at each of the one or more property hierarchy levels of the application property scheme; receive a request for a configuration value associated with at least one of the plurality of properties; identify request attributes related to at least one of the one or more property hierarchy levels based on the received request; iteratively search for the configuration value at each of the one or more property hierarchy levels of the generated application property scheme based on the identified attributes for the request; and send a response including the configuration value based on the search.

According to certain embodiments, a non-transitory computer readable medium is disclosed as storing instructions that, when executed by a computer, cause the computer to perform functions to: obtain a system configuration file via a network; generate an application property scheme/object having one or more property hierarchy levels for configuring a web application during execution of the web application, based on the obtained system configuration file, the system configuration file defining configuration values for a plurality of properties at each of the one or more property hierarchy levels of the application property scheme; receive a request for a configuration value associated with at least one of the plurality of properties; identify request attributes related to at least one of the one or more property hierarchy levels based on the received request; iteratively search for the configuration value at each of the one or more property hierarchy levels of the generated application property scheme based on the identified attributes for the request; and send a response including the configuration value based on the search.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims.

It is to be understood that both the foregoing general description and the following detailed description are exemplary and explanatory only and are not restrictive of the scope of disclosed embodiments, as set forth by the claims.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DESCRIPTION OF THE EMBODIMENTS

The present disclosure is directed to overcoming one or more of the above referenced issues. Specifically, the present disclosure is directed to systems and methods for providing a highly scalable, flexible and efficient mechanism for system configuration of a web application based on a general property hierarchy scheme. Reference will now be made in detail to the exemplary embodiments of the disclosure, examples of which are illustrated in the accompanying drawings. Wherever possible, the same reference numbers will be used throughout the drawings to refer to the same or like parts.

As noted above, the present disclosure relates to systems and methods for configuring a web application based on a general property hierarchy scheme. Such a property hierarchy scheme may have one or more property hierarchy levels defined for a plurality of properties associated with the web application. The web application may be any type of application or program executable at an application server for providing various types of functionality to users via a network interface. Such an interface may be, for example, a web page accessible via a web browser executable at a user's computing device. The computing device may be, for example and without limitation, a mobile device or a desktop computer.

An example of a web application that may be configured using a general property hierarchy scheme is a global search application that provides search query results to users of a search website. For example, the global search application may interface with a search engine or third-party search service and provide search results to a user via a web page based on search terms submitted by the user via a search field displayed on the web page. Furthermore, the search results that are provided may be customized based on the geographic location of the particular user, e.g., as derived from the originating Internet Protocol (IP) address of the user-initiated request via the web page. As will be described in further detail below, such localization of output (e.g., search results) for a particular user (or group of users) may be performed by a web application (e.g., global search application) based on configuration values defined for different localization parameters or properties at various levels of a general property hierarchy scheme generated for the web application.

Benefits of such a general property hierarchy scheme for configuring a web application include, but are not limited to, adaptability, accessibility and flexibility for purposes of production support and testing. In particular, a hierarchical property system may be used to manage the extreme number of combinations that would result from a wide range of delivery targets. A general property hierarchy scheme may provide a capability to define any number of hierarchy levels, which allows a web application to manage an unlimited number of configurable properties for purposes of localization and internationalization for a wide range of potential target users. Furthermore, such a general property hierarchy scheme may extend beyond conventional localization and internationalization solutions by allowing application behavior and presentation to be tailored not only for country, language, etc., but for any arbitrary criteria as may be defined by product management. Such criteria may include, for example, any number of partners and themes or combinations thereof, e.g., brand-partner or partner-theme combinations. Accordingly, such a property hierarchy system can grow to meet new needs of an application as it continues to evolve while also being used to support future new web applications that may be delivered on an existing platform without requiring excessive system modifications.

As will be described in further detail below, a general property hierarchy system for a web application may be used to generate an application property scheme including different hierarchy levels that correspond to various attributes of the types of user requests that the web application may be configured to handle. The hierarchy levels of such an application property scheme may correspond to, for example, different product brands, countries or third-party entities, e.g., partners associated with a particular brand or type of product.

Figure 1:
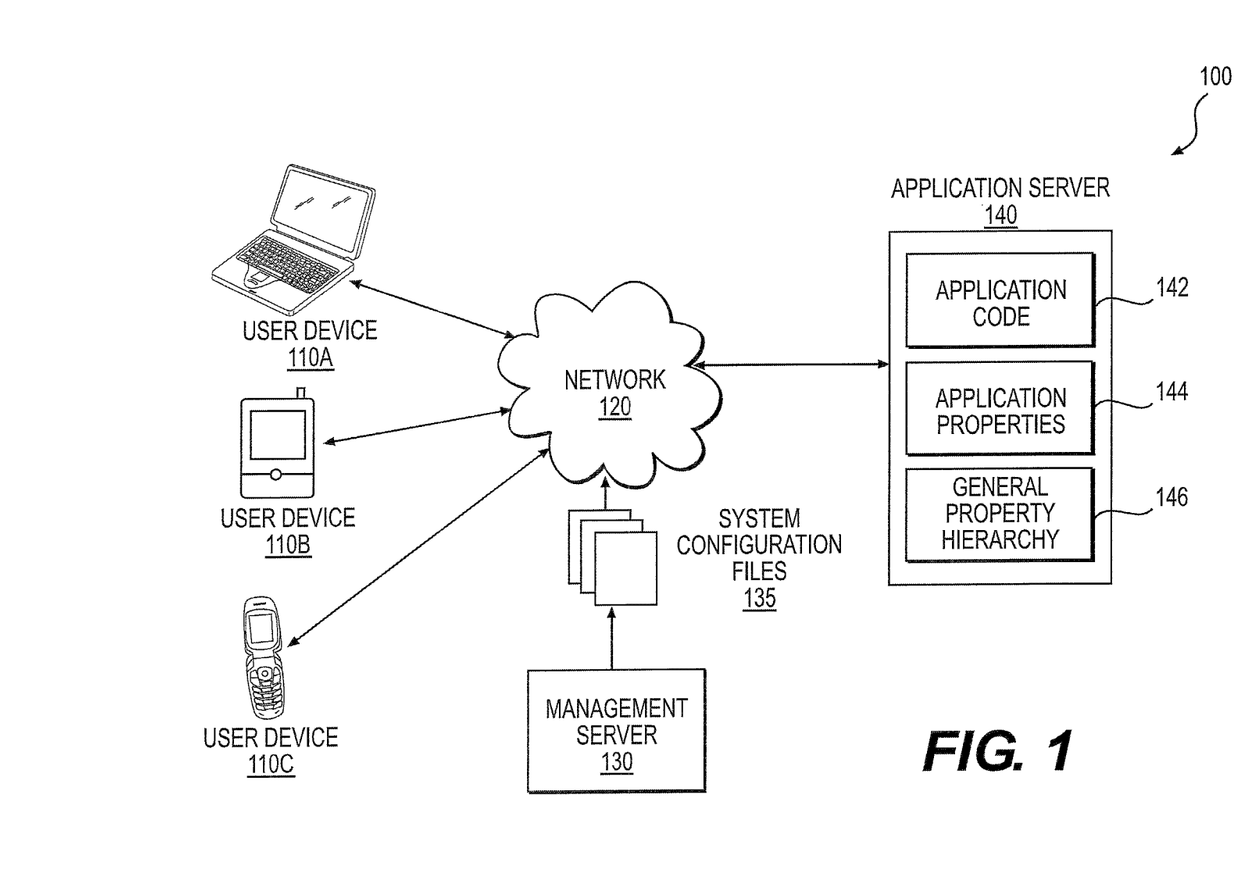
FIG. 1 is a schematic diagram of an exemplary network environment and server systems suitable for practicing the embodiments of the present disclosure.

FIG. 1 is a schematic diagram of an exemplary network environment 100 suitable for practicing an embodiment of the present disclosure. As shown in FIG. 1, network environment 100 includes user devices 110*a*, 110*b* and 110*c*, a management server 130, one or more system configuration files 135, and an application server 140, any or all of which may be communicatively coupled via an electronic network 120, such as the Internet.

In an example, application server 140 may be configured to host a web service or application that communicates with a client application executable at any of user devices 110*a*, 110*b* and 110*c* via network 120. For example, the respective users of devices 110*a*, 110*b* and 110*c* may access different functions provided by the web application via a graphical user interface (GUI) of the client application. Such functions may include, for example and without limitation, uploading user-generated data or content to a web site or alternatively, requesting content from other users or third-party content providers, which may be downloaded to the user's device through an application interface provided by the application server 140.

Network 120 may be any type of electronic network or combination of networks used for communicating digital content and data between various computing devices. Network 120 may be, for example, a local area network, a medium area network, or a wide area network, such as the Internet. While only user devices 110*a*, 110*b* and 110*c* are shown in FIG. 1, network environment 100 may include any number of user devices. Likewise, while only management server 130 and application server 140 are shown in FIG. 1, it should be understood that network environment 100 may include additional servers as desired for a particular implementation. Further, each of management server 130 and application server 140 may be implemented using a single server or across multiple servers, e.g., in a clustered computing environment or server farm.

In the example shown in FIG. 1, user device 110*a* may be a desktop, laptop, or other type of personal computer, user device 110*b* may be a tablet device or other type of mobile computing device having a touchscreen display, and user device 110c may be a mobile device, smartphone, and/or personal digital assistant ("PDA"). However, it should be noted that each of user devices 110a, 110b and 110c may be any type of electronic device configured to send and receive data, such as websites, multimedia content, and electronic advertisements, over network 120. Examples of such mobile computing devices include, but are not limited to, a laptop computer, a handheld computer, a personal digital assistant (PDA), a cellular telephone, a network appliance, a camera, a smart phone, an enhanced general packet radio service (EGPRS) mobile phone, a media player, a navigation device, a portable game console, or any combination of these computing devices or other types of mobile computing devices having at least one processor, a local memory, a display, one or more user input devices, and a network communication interface. The user input device(s) may include any type or combination of input/output devices, such as a display monitor, touchpad, touchscreen, microphone, camera, keyboard, and/or mouse.

Management server 130 and application server 140 may each represent any of various types of servers including, but not limited to a web server, an application server, a proxy server, a network server, or a server farm. Each of management server 130 and application server 140 may be implemented using any general-purpose computer capable of serving data to other computing devices including, but not limited to, user devices 110a, 110b, 110c or any other computing device (not shown) via network 120. Such a general-purpose computer can include, but is not limited to, a server device having a processor and memory for executing and storing instructions. The memory may include any type of random access memory (RAM) or read-only memory (ROM) embodied in a physical storage medium, such as magnetic storage including floppy disk, hard disk, or magnetic tape; semiconductor storage such as solid state disk (SSD) or flash memory; optical disc storage; or magneto-optical disc storage. Software may include one or more applications and an operating system. Hardware can include, but is not limited to, a processor, memory and graphical user interface display. Each server may also have multiple processors and multiple shared or separate memory components that are configured to function together within, for example, a clustered computing environment or server farm.

In an embodiment, user devices 110a, 110b and 110c are each configured to execute a client application installed at the respective device. The client application at each device may be used for receiving and displaying electronic content from application server 140. The client application executable at each user device may be, for example, a web browser. The web browser may be a standalone application or integrated as a component of another mobile application executable at each of user devices 110a, 110b and 110c.

Further, each of user devices 110a, 110b and 110c may be configured to receive application content through an interface provided by application server 140 via network 120. The application content provided by application server 140 may be based on, for example, user requests initiated via a graphical user interface (GUI) of the client application executable at each device. The GUI of the client application executable at each of user devices 110a, 110b and 110c may be configured to present the content to a user at each device via a display of the respective user devices 110a, 110b and 110c. The GUI of the client application may include, for example, various control elements enabling the user to request various types of web content, e.g., by submitting search queries via a search field displayed on a web page or by using navigation controls to browse different web pages.

In an example, application server 140 may be configured to communicate with one or more third-party content servers (not shown) to retrieve content (e.g., web page content) via network 120 based on the user requests that it receives from user devices 110a, 110b or 110c. Such content servers may be owned and/or operated by any entities that publish online or electronic content. For example, different content servers may be operated by different content publishers or online content providers, including those associated with various search engines, e-mail programs, RSS feed providers, magazines, e-zines, blogs, or any other online site or program that distributes online content. Thus, publishers may interact with user devices 110a, 110b or 110c, management server 130, application server 140, or any other servers, including, but not limited to, DNS servers, ad servers, content distribution network servers, through one or more content distribution servers (not shown) via network 120. Thus, publishers may be able to distribute electronic content to various entities located within the network environment 100 of FIG. 1.

As shown in the example of FIG. 1, application server 140 also may be configured to communicate with management server 130 via network 120 to retrieve one or more system configuration files 135. As will be described in further detail below, the system configuration file(s) 135 may be used by general property hierarchy system 146 to generate an application property framework or scheme having one or more property hierarchy levels for configuring a web application hosted at application server 140.

As shown in FIG. 1, application server 140 may include application code 142, a set of application properties 144 and/or a general property hierarchy system 146. Application code 142 may include, for example, code and data for a web application or service hosted at application server 140. Application code 142 may be, for example, a software program including computer or processor-readable instructions and associated data related to the web application. As such, the code and data for the web application may reside locally at application server 140 (e.g., in a local memory or data store coupled to application server 140). In this example, application properties 144 represents a set of configurable properties associated with the web application. For example, application properties 144 may be stored in a local memory of application server 140 and organized as part of an application property framework or scheme having one or more hierarchy levels. General property hierarchy system 146 in this example may be configured to generate such an application property scheme based on configuration values defined in system configuration file(s) 135 for various application properties.

As will be described in further detail below, the configuration values defined in system configuration file(s) 135 may be used by a property loading/re-loading subsystem of general property hierarchy system 146 to dynamically configure the web application during its execution (or during execution of application code 142 at application server 140). As shown in FIG. 1, system configuration file(s) 135 may be obtained by application server 140 from management server 130 via network 120. In an example, application server 140 may send a request to management server 130 for the system configuration file(s) 135 via network 120. Alternatively, system configuration file(s) 135 may be obtained by application server 140 from a predetermined network location accessible to both application server 140 (e.g., for retrieving the files) and management server 130 (e.g., for storing the files) via network 120. The obtained system configuration file(s) 135 may then be processed by general property hierarchy system 146 in order to generate the application property scheme having one or more hierarchy levels for configuring values for application properties 144 at each hierarchy level, as described above. Accordingly, the system configuration file(s) 135 may be used to define configuration values for a plurality of application properties 144, which may be associated with the web application and referenced by application code 142 during execution of the web application at application server 140. Furthermore, different configuration values may be defined for the plurality of properties at each of the one or more property hierarchy levels of the application property scheme.

Also, as will be described in further detail below, general property hierarchy system 146 may include additional subsystems including, but not limited to, a request attributes subsystem (e.g., request attributes subsystem 304 of FIG. 3, as will be described below) for processing incoming user requests received at application server 140 from user devices 110*a*, 110*b* or 110*c* via network 120. The user requests may be received by, for example, an application interface provided by application code 142 for intercepting user requests directed to the web application hosted at application server 140 and initiated from a client application executable at user devices 110*a*, 110*b* or 110*c*.

In an example, the aforementioned request attributes subsystem of general property hierarchy system 146 may process each incoming request to extract request attributes relevant to one or more property hierarchy levels within the generated application property hierarchy scheme associated with the web application. General property hierarchy system 146 may then return appropriate property values for requested application properties 144 based on the extracted request attributes and the application property hierarchy scheme. The extracted request attributes may include, for example and without limitation, one or more property keys that are mapped to one or more of application properties 144.

In a further example, general property hierarchy system 146 may also include a property retrieval subsystem (e.g., property loader 214 and flexible scheduler 216 of FIG. 2, as will be described below), which may be configured to retrieve individual property configuration values associated with a specified property key from the appropriate property hierarchy level of the application property hierarchy scheme generated for the web application. The aforementioned subsystems of general property hierarchy system 146 related to property loading, request attributes and property retrieval will be described in further detail below in reference to the examples shown in FIGS. 2-5C.

In one embodiment, each of management server 130, application server 140 or any of the aforementioned content distribution servers may provide, for example, an interface (e.g., in the form of an application programming interface (API)) for enabling communications between a particular service or application hosted at each of the servers and the client application executable at each of user devices 110*a*, 110*b* and 110*c*. The particular service in this example may be a web search service configured to respond to user requests (e.g., search queries or content retrieval requests) received from the client application via network 120. However, it should be noted that the techniques described herein are not limited web search applications or services and that these techniques may be used for any of various other types of web applications. Such other types of web applications may include, but are not limited to, web applications that deliver different types of content (e.g., text, media, or targeted advertisements) for various delivery targets (e.g., geographic regions, languages or market segments).

While not shown in FIG. 1, application server 140 may be implemented using multiple servers (e.g., in a server farm), which may be communicatively coupled to each other via a local area network. Furthermore, application server 140 may be communicatively coupled to one or more databases or data storage devices (not shown). Such data storage devices may be used to store any type of data or content accessible by application server 140 and its components (e.g., application code 142 and general property hierarchy system 146). Such data or content may include, for example and without limitation, application properties 144 or general text or media content for providing to user devices 110*a*, 110*b* or 110*c* via network 120.

Figure 2:
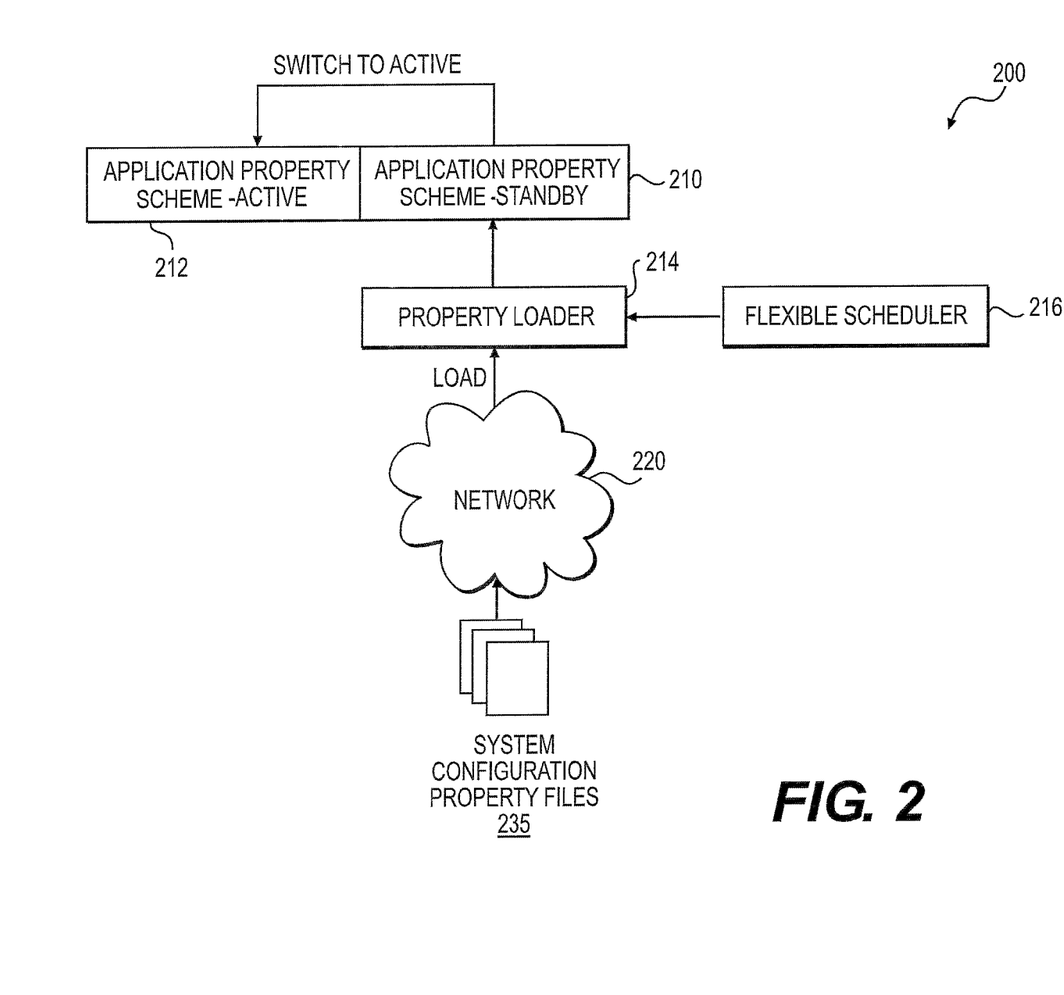
FIG. 2 is a diagram of an exemplary system for loading and re-loading property configuration values for a general property hierarchy scheme of a web application.

FIG. 2 is a diagram of an exemplary system 200 for loading and re-loading property configuration values for a general property hierarchy scheme of a web application. For purposes of discussion, system 200 will be described using network environment 100 of FIG. 1, as described above. However, system 200 is not intended to be limited thereto. As shown in FIG. 2, system 200 includes an application property scheme 210, an application property scheme 212, a property loader/re-loader 214, a flexible scheduler 216, a network 220 and one or more system configuration files 235.

In an example, property loader 214 and flexible scheduler 216 may be components of general property hierarchy system 146 of application server 140 in network environment 100 of FIG. 1, as described above. Further, application property scheme 210 and application property scheme 212 may be different instances of an application property scheme generated by general property system 146 based on configuration values for various application properties defined within system configuration files 235. As shown in FIG. 2, system configuration files 235 may be loaded by, for example, property loader 214 via network 220. Network 220 may be implemented using, for example, network 120 of FIG. 1, as described above.

In an example, a property loading sequence by property loader 214 may be triggered at system startup (e.g., startup of the general property system 146). Property loader 214 may also perform a property re-loading sequence, which can be triggered at periodic intervals after system startup. Such a property re-loading sequence may be controlled by, for example, flexible scheduler 216. Property loader 214 may perform a similar or the same sequence of actions for both property loading and re-loading. The actions performed by property loader 214 may include, but are not limited to, loading or retrieving system configuration files 235 from a designated location accessible via network 220. The designated location may be, for example, a database or other type of data store coupled to a production management server (e.g., management server 130 of FIG. 1, as described above). The number of system configuration files 235 may be arbitrary. For example, a particular web application may specify all property key-value pairs in a single configuration file or may distribute the property key-value pairs into multiple separate files for better organization or easier management.

Additionally, property loader 214 may process the configuration data extracted from the retrieved system configuration file(s) 235 in order to generate an application property scheme, as described previously. This may include, for example, registering property key-value pairs, as defined in the system configuration file(s) 235, into the appropriate hierarchy levels of the generated application property scheme.

As noted above, application property scheme 210 and application property scheme 212 may be different instances or copies of the hierarchical application property scheme generated by the general property hierarchy system (e.g., general property system 146 of FIG. 1, as described above) based on configuration data, including configuration values for different property hierarchy levels, loaded from system configuration property files 235. Application property scheme 210 and application property scheme 212 may be, for example, different data structures used to store configuration data including values for application properties 144 of FIG. 1, as described above. Further, the data structures corresponding to application property scheme 210 and application property scheme 212 may be stored at different locations in a local memory or data store accessible to application server 140 of FIG. 1, as described above. Such memory locations may be designated as standby and active memory locations for storing application property scheme 210 and application property scheme 212, respectively.

Accordingly, application property scheme 210 and application property scheme 212 may correspond to different versions of property configuration data for the same application property scheme, and the active and standby designations for the respective memory locations may be used to control read/write access of application configuration property values. Furthermore, the standby and active designations for each data structure and/or memory location may be interchangeable. Thus, as shown in FIG. 2, the designation of the data structure and/or memory location associated with application property system 210 may be switched from "standby" to an "active."

To support dynamic reloading, application property scheme 210 may be generated in a standby memory location as the data is processed. If all data from system configuration files 235 is processed without error, application property scheme 210 in the designated standby memory location (e.g., associated with application properties 144 of FIG. 1, as described above) may be considered complete. At this point, property loader 214 may issue a command to the web application (e.g., to application code 142 of FIG. 1, as described above) that changes the designated standby location (corresponding to application property scheme 210) to be the new active memory location. In addition, the previous active memory location (corresponding to application property scheme 212) may become the new standby location. The new standby and active memory locations may be the designations used for the next property reloading sequence, e.g., as scheduled by flexible scheduler 216. The use of switchable active and standby versions of the application property scheme allows property loader 214 of the general property hierarchy system (e.g., general property hierarchy system 146 of FIG. 1) to support dynamic reloading of configuration values for application properties (e.g., application properties 144 of FIG. 1, as described above) in a live production platform while still handling normal incoming requests.

Furthermore, upon receiving an indication of a new configuration value (or a change to an existing value) for at least one of the plurality of properties defined in the system configuration file(s) 235, flexible scheduler 216 may trigger property loader 214 to dynamically update the application property scheme based on the new or updated configuration value. An advantage of such dynamically updateable system configuration values includes not having to restart the web application server (e.g., application server 140 of FIG. 1) whenever a property is modified or a new property is defined. The property reloading feature of property loader 214 also makes it possible for the production servers to access the system configuration file(s) 235 over a communication network (e.g., network 120 of FIG. 1). As such, the system configuration file(s) 235 do not need to reside locally on the web application server.

Figure 3:
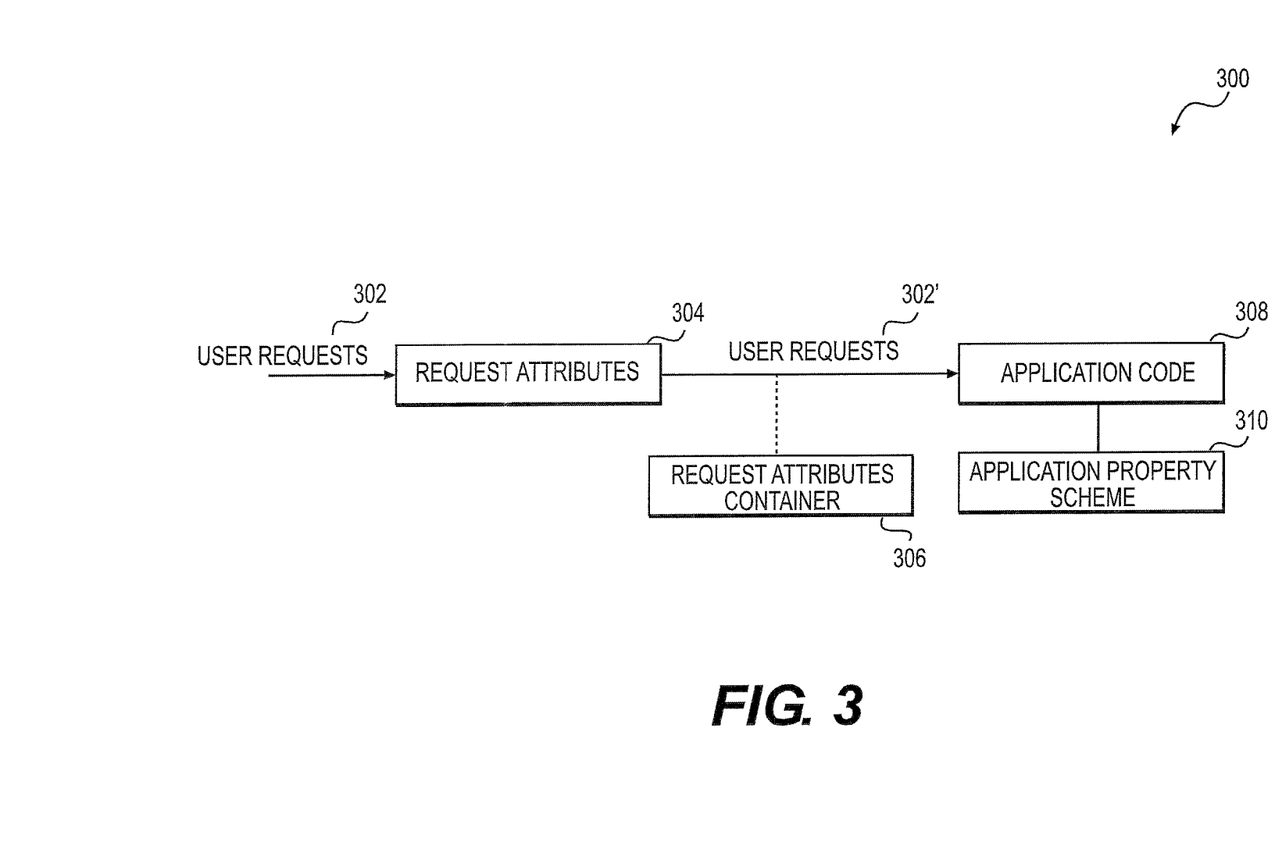
FIG. 3 is a flow diagram of an exemplary system for processing user requests based on the general property hierarchy scheme of the web application of FIG. 2.

FIG. 3 is a flow diagram of an exemplary system 300 for processing user requests based on the general property hierarchy scheme of a web application. For purposes of discussion and explanation, system 300 will be described using network environment 100 of FIG. 1 and system 200 of FIG. 2, but system 300 is not intended to be limited thereto.

In the example shown in FIG. 3, a request attributes subsystem 304 of the general property hierarchy system (e.g., general property hierarchy system 146 of FIG. 1) processes incoming user requests 302. User requests 302 may include, for example and without limitation, requests initiated by users at various computing devices (e.g., client devices 110a, 110b or 110c of FIG. 1, as described above) and received via a network interface of the web application or associated general property hierarchy system. Such user-initiated requests may include, for example, web requests based on a user's interaction with one or more web pages loaded in a web browser or other type of client application executable at the user's computing device.

Request attributes subsystem 304 may be configured to extract various request attributes from each of the user requests 302 that are received based on the application property scheme 310 generated for the web application by the general property hierarchy system. In an example, request attributes subsystem 304 analyzes each of the incoming user requests 302 to extract request attributes relevant to one or more property hierarchy levels defined for application property scheme 310. Once a request attribute is identified and extracted, request attributes subsystem 304 may add the request attribute to a request attributes container 306. Request attributes container 306 may be associated with each individual user request or a group of user requests processed by request attributes subsystem 304.

In some implementations, request attributes container 306 may be added to the relevant user request(s) to which it is associated. For example, a user request may be a web request in the form of a Hypertext Transfer Protocol (HTTP) request and request attributes container 306 including extracted request attributes may be added to a header or body portion of the user request. Thus, in the example shown in FIG. 3, user requests 302' may represent one or more user requests 302 that include associated request attributes container 306 upon being processed by request attributes subsystem 304. The request attributes container 306 for an incoming user request may be accessible to application code 308 (e.g., application code 142 of FIG. 1, as described above) and further, may be used as a parameter for retrieving property values from application property scheme 310, as generated for the corresponding web application.

Application property scheme 310 may include different hierarchy levels corresponding to various attributes that may be relevant to the types of user requests processed by the general property hierarchy system for the web application. In an example, the hierarchy levels may correspond to different product brands, countries or third-party entities (e.g., partners associated with a particular brand or type of product). However, it should be noted that request attributes are not intended to be limited to those listed in the examples provided herein and that such request attributes may be based on any criteria (e.g., partners, themes, etc.) that may be defined by, for example, a product management group. Accordingly, the request attributes that may be extracted from incoming user web requests in this example may include, but are not limited to, a brand attribute, a country attribute, and/or a partner attribute. Request attributes subsystem 304 may be configured to extract the brand attribute based on, for example, the domain of an incoming web request. The country attribute may be derived from, for example, the originating Internet protocol (IP) address associated with the incoming web request. The partner attribute may be identified based on, for example, a predefined parameter of the incoming request, e.g., a value stored in or retrieved from an Internet or Web cookie file. The predefined parameter associated with a partner or a known third-party entity associated with a product or website may be, for example, a unique identifier or code associated with the third-party entity. The unique identifier may have been previously generated and assigned to the third-party entity by the general property hierarchy system. In an example, request attributes subsystem 304 may extract request attributes from incoming user requests 302 based on a look-up table stored in a local memory, which maps relevant request attributes to the appropriate values defined in the general property hierarchy system.

Figure 4:
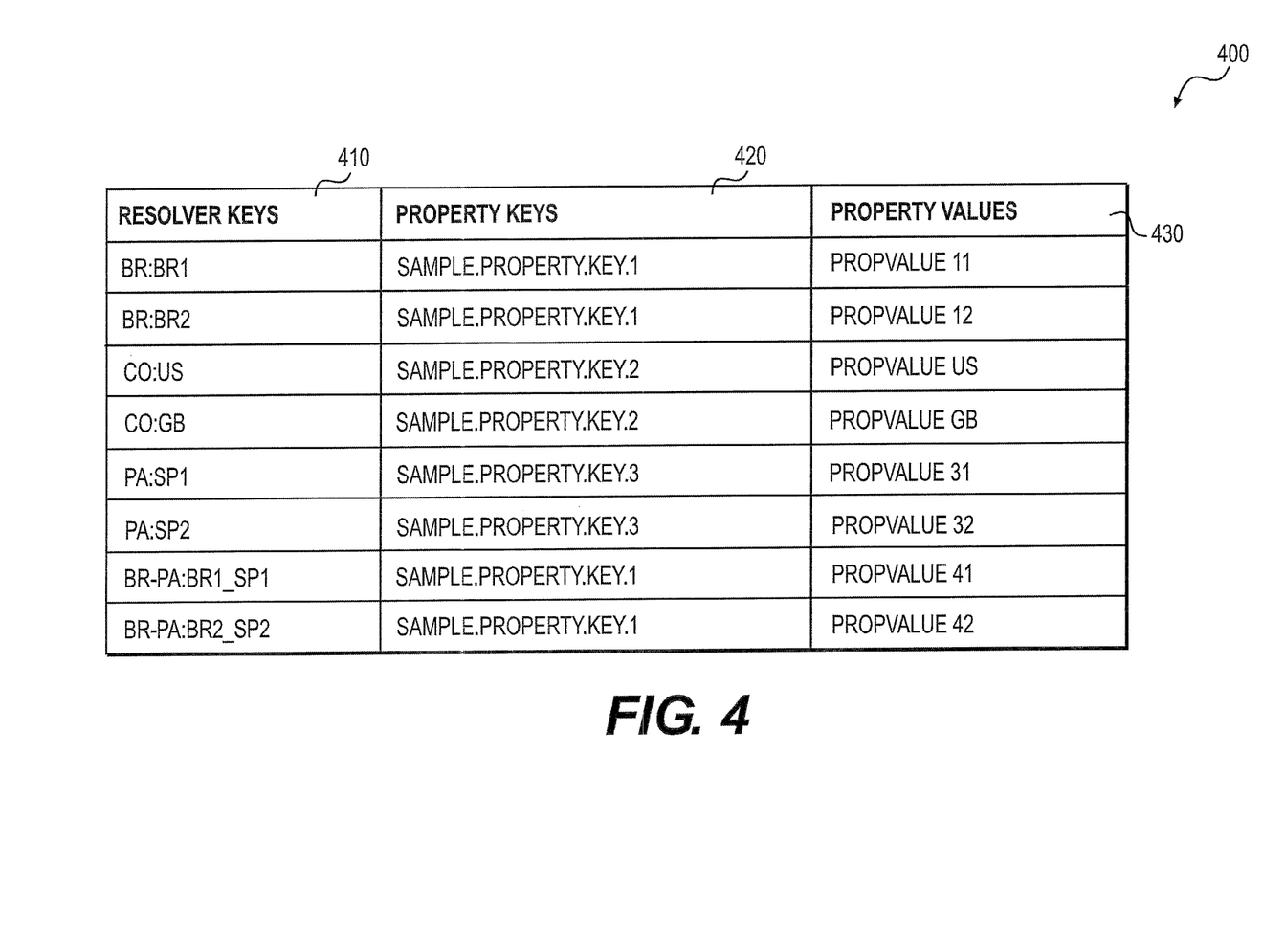
FIG. 4 is an exemplary table mapping property keys and values for a general property hierarchy scheme of a web application.

As shown in the example of FIG. 4, a look-up table also may be used to store a mapping of application properties to one or more property keys associated with different configuration values. In FIG. 4, a table 400 includes a set of resolver keys 410 that are mapped to property keys 420 and corresponding property values 430. Using the example described above in which the hierarchy levels correspond to different product brands, countries, or third-party entities or partners, the resolver keys 410 in table 400 may be based on the following predefined properties/request attributes and corresponding resolver patterns: Brand ("BR"), Country ("CO"), Partner ("PA"), and Brand-Partner ("BR-PA"). In this example, the Brand-Partner hierarchy is a combination of the Brand and Partner properties. It should be noted that additional hierarchy levels may be defined using any combination of individual properties or any other properties as desired for a particular implementation.

In an example, the entries in table 400 may correspond to entries defined in the one or more system configuration file(s) 235. The system configuration file(s) 235 may be formatted as text files or in any other format as desired for a particular implementation. In an example, each entry in a text file defining different property key-to-value mappings may include various elements corresponding to each set of resolver keys 410, property keys 420, and property values 430. The elements for each entry may include, but are not limited to, the qualifier, the property key, and the value. The qualifier element may include, for example, the type of property or resolver pattern, such as "BR" for Brand or "CO" for Country in addition to the corresponding resolver key (i.e., the portion of each entry in the resolver keys 410 column following the colon symbol). Thus, in the example shown in FIG. 4, the resolver keys defined for the Brand (BR) property include "BR1" and "BR2." Similarly, the resolver keys defined for the Country (CO) property include "US" and "GB." Examples of delimiters that may be used to separate the different components of the key and elements of each entry mapping the property key-to-value pairs include, but are not limited to, underscore symbols, tab characters or spaces. However, it should be noted that any type of character or symbol may be used to separate different elements and/or entries defining property key-value pairs within the system configuration file(s) 235.

Referring back to FIGS. 1 and 3, application code 142 or application code 308 of the corresponding web application may be configured to retrieve the appropriate configuration values for various properties based on request attributes extracted from each incoming user request and the property key-value mappings defined in table 400 of FIG. 4, as described above. As described previously, general property hierarchy system 146 of FIG. 1 may also include a property retrieval subsystem that is configured to retrieve individual property configuration values associated with a specified property key from the appropriate property hierarchy level of the application property hierarchy scheme generated for the web application. The property retrieval subsystem of such a general property hierarchy system will be described in further detail below in reference to the examples shown in FIGS. 5A-5C.

Figure 5A:
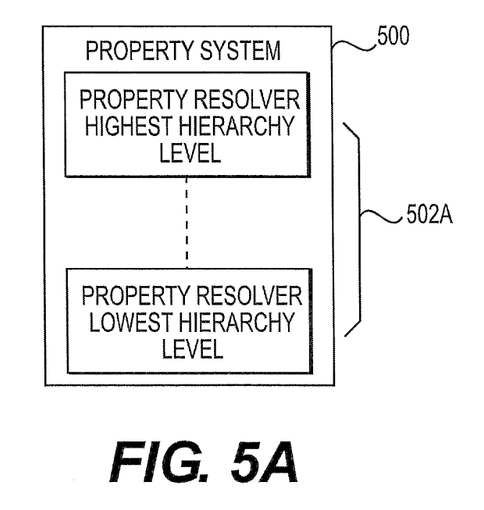
FIGS. 5A-5C illustrate exemplary components of a property retrieval subsystem of a general property hierarchy system for a web application.
Figure 5B:
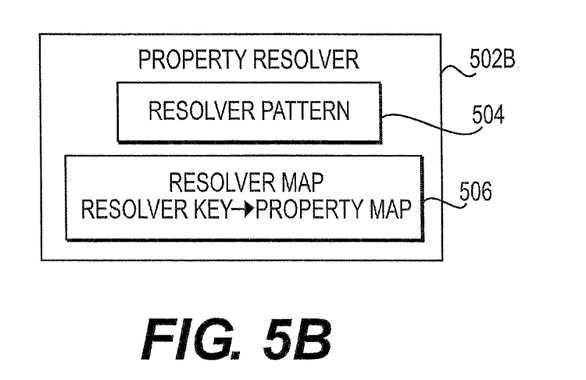
Figure 5C:
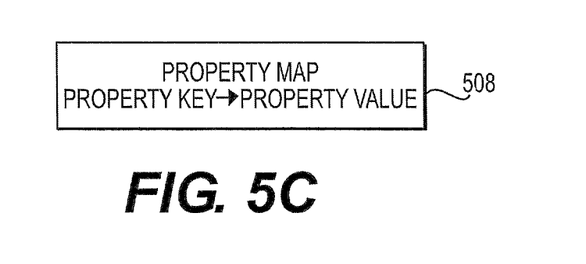

FIGS. 5A-5C illustrate exemplary components of a property retrieval subsystem of a general property hierarchy system for a web application. The general property hierarchy system may be implemented using, for example, general property hierarchy system 146 of FIG. 1, as described above. The internal structure of the property retrieval subsystem may include, for example, a property system having one or more property resolvers, which in turn include one or more resolver key and property maps, as shown in FIGS. 5A-5C and as will be described in further detail below.

FIG. 5A illustrates a property system 500 having a plurality of property resolvers 502A corresponding to various hierarchy levels of an application property scheme (e.g., application property scheme 310 of FIG. 3, as described above). Such an application property scheme may have been generated by, for example, general property hierarchy system 146 of FIG. 1, as described above. As shown in FIG. 5A, the hierarchy levels of the application property scheme may vary from a highest to a lowest hierarchy level based on a predetermined priority associated with each level. In an example, property system 500 is the top level component of the overall property retrieval subsystem and property resolvers 502A represent the general property hierarchy for a web application. Accordingly, a separate property resolver may be designated for each hierarchy level in the application property scheme generated for the web application. As described above, the application property scheme may have been generated by the general property hierarchy system (e.g., or property loading subsystem thereof), as described above with respect to system 100 of FIG. 1 and system 200 of FIG. 2. The property resolvers 502A may be stored as a list that reflects the order of hierarchy and/or priority in the application property scheme generated for the web application.

The multiple hierarchy levels of the application property scheme generated for the web application may be based on, for example, production requirements specified by a product management team associated with development of the web application. For instance, all properties used by product management to manage the user experience across brands, locales, languages and partners may be specified within the various hierarchy levels of the application property scheme. In addition, there may be certain properties or features of the web application that may have limited or no exposure to product management, e.g., an option to enable/disable a certain application function or feature. Such system-level properties also may be supported by the application property scheme for the web application, for example, by defining a system hierarchy level that may be designated as the base level of the multi-level application property scheme. An example of such a multi-level hierarchy for a web application is shown in the numbered list below, where the first level (corresponding to "System") is the base level having the lowest priority relative to the other hierarchy levels:

1. System ("SYS");
2. Brand ("BR");
3. Country ("CO");
4. Language ("LANG");
5. Brand-Partner ("BR-PA");
6. Brand-Country ("BR-CO");
7. Brand-Partner-Country ("BR-PA-CO").

As shown in the example property scheme above, some hierarchy levels may be defined as combinations of other hierarchy levels. However, it should be noted that the priority assigned to each level may be varied as desired for a particular implementation. Thus, in the example property scheme above, the first level (e.g., "System") may be assigned the highest priority and the seventh level ("Brand-Partner-Country") may be assigned the lowest priority or vice versa.

FIG. 5B illustrates an exemplary property resolver 502B including a resolver pattern 504 and a resolver map 506. Property resolver 502B may be, for example, one of the property resolvers 502A of the property system 500 of FIG. 5A. Accordingly, property resolver 502B may be generated for a particular hierarchy level in the application property scheme. Similar property resolvers also may be generated for each of the other hierarchy levels in the application property scheme. As shown in FIG. 5B, property resolver 502B includes a resolver pattern 504 and a resolver map 506. Resolver pattern 504 in this example may be based on the particular hierarchy level to which the property resolver 502B corresponds. As described above in a previous example, different hierarchy levels may correspond to Brand and Country properties, and resolver pattern 504 may be, for example, "BR" for the Brand property/hierarchy level or "CO" for the Country property/hierarchy level. It should be noted that any set of characters or symbols may be used to represent resolver patterns for different properties and hierarchy levels within a given application property scheme.

In the example shown in FIG. 5B, resolver map 506 includes a mapping of a resolver key to a property map. In this example, the resolver key of resolver map 506 may represent, for example, a specific occurrence of resolver pattern 504, e.g., specific values of the request attribute(s) relevant to the corresponding hierarchy level, as described above. Referring back to table 400 of FIG. 4, examples of resolver keys for the Brand, Partner and Brand-Partner hierarchy levels include "BR1", "SP1" and "BR1_SP1," respectively.

FIG. 5C illustrates an exemplary property map 508. As shown in FIG. 5C, property map 508 includes a mapping of property keys to property values. It should be noted that the internal structure illustrated in FIGS. 5A-5C is a completely general structure that is not tied in to any specific application property hierarchy scheme and that may be adapted to any application property hierarchy scheme generated for a web application, e.g., based on values defined in one or more system configuration files, as described previously. In this way, the general property hierarchy system described herein may be used to generate application property schemes representing any number of property hierarchies and to implement an arbitrary property hierarchy for a web application that supports efficient property retrieval. As the general property hierarchy system of the present disclosure allows for the definition of an arbitrary number of property hierarchy levels, it can be tailored easily to the specific needs of different web applications.

Figure 6:
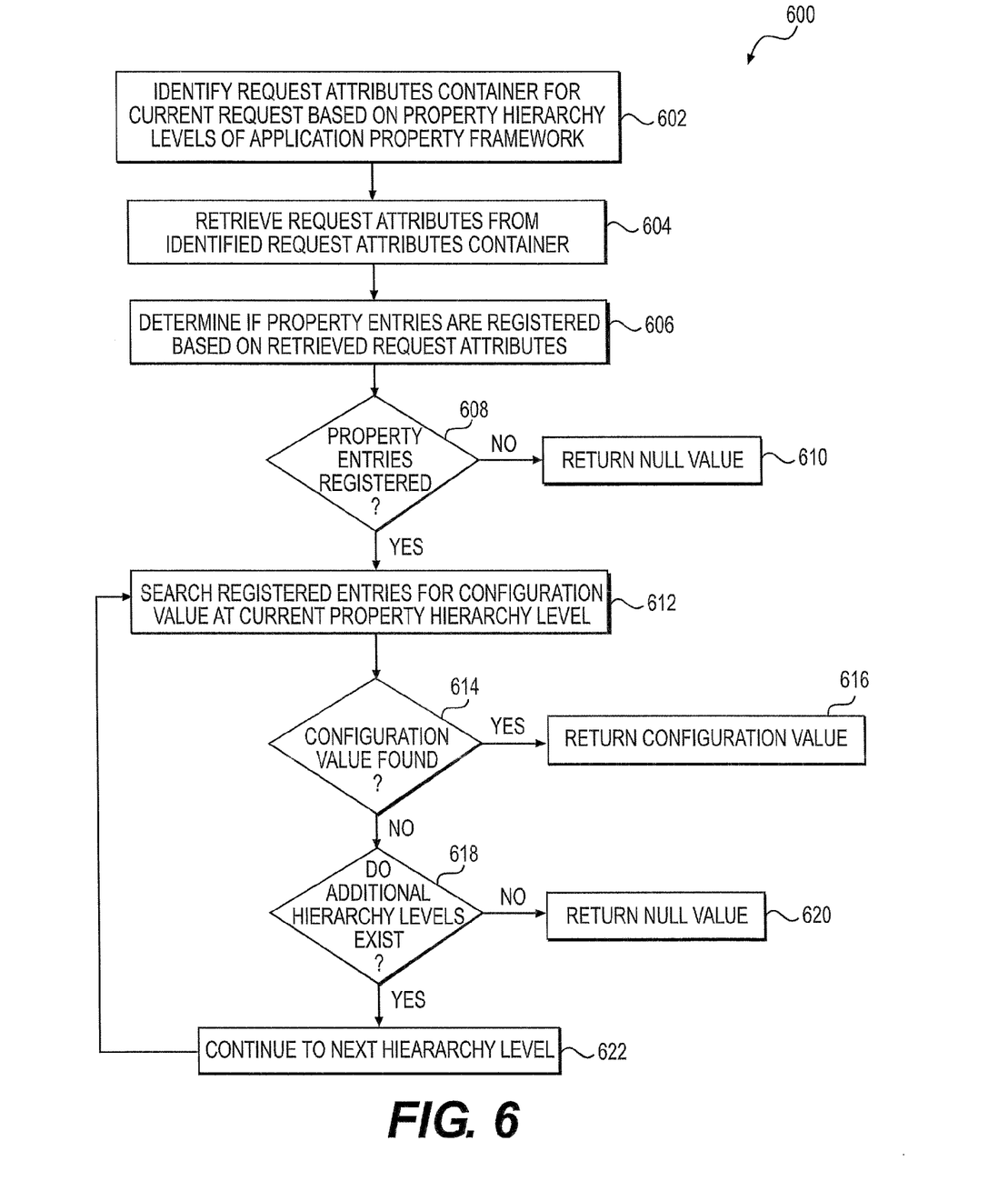
FIG. 6 is a process flow diagram of an exemplary method for configuring a web application using a general property hierarchy scheme consistent with the present disclosure.

FIG. 6 is a process flowchart of an exemplary method 600 for configuring a web application using a general property hierarchy scheme. Method 600 may be used, for example, to process user requests and retrieve appropriate configuration values associated with one or more specified properties from a hierarchy level of an application property scheme for a web application. As shown in FIG. 6, method 600 may include, for example and without limitation, one or more of steps 602, 604, 606, 608, 610, 612, 614, 616, 618, 620 and 622. For ease of explanation, method 600 is described in the context of network environment 100 of FIG. 1, system 200 of FIG. 2, system 300 of FIG. 3, and property system 500 and associated components of FIGS. 5A-5C, as described above, but method 600 is not intended to be limited thereto. Further, for ease of explanation, method 600 will be described in reference to the application property scheme and property configuration values shown in table 400 of FIG. 4, as described above. However, method 600 is not intended to be limited thereto and may be used for any application property scheme and set of predefined property configuration values.

Method 600 begins with step 602, in which request attributes for a current incoming user request are identified based on property hierarchy levels within an application property framework or scheme for a web application. The user request may originate from, for example, a client application executable at a user device (e.g., user device 110a, 110b or 110c of FIG. 1, as described above), and received at an associated application server (e.g., application server 140 of FIG. 1) hosting a web application via a communication network (e.g., network 120 of FIG. 1, as described above). The received user request may then be redirected to the general property hierarchy system (e.g., general property hierarchy system 146 of FIG. 1) by the web application (e.g., application code 142 of FIG. 1) hosted at the application server. The request attributes may be stored in, for example, a request attributes container (e.g., request attributes container 306 of FIG. 3, as described above) associated with the current request.

In step 604, request attributes may be retrieved from the request attributes container identified in step 602 for the current request. Method 600 then proceeds to steps 606 and 608, which include determining whether or not entries for configuring properties of the web application have been registered for the application property scheme based on the request attributes retrieved in step 604. Such property entries may have been loaded from one or more system configuration files associated with the web application and registered (e.g., by property loader 214 of FIG. 2, as described above) for at least one hierarchy level of the application property scheme generated for the web application.

If property entries are not registered, method 600 may proceed to step 610, in which a null value is returned (e.g., to the application code), thereby signaling that entries for property configuration values for the specified property key have not been registered. However, if property entries are registered, method 600 may proceed to steps 612 and 614, which include searching for the registered entries for the property configuration value at a first or current hierarchy level of the application property scheme. In an example, the first hierarchy level in which the search is performed may be the lowest hierarchy level, which may also correspond to the lowest level of priority relative to the other hierarchy levels within the application property scheme. The search for the appropriate configuration value may be based on, for example, a property key specified in the incoming request.

If a property configuration value corresponding to the specified property key is found in step 614, method 600 may proceed to step 616, in which the configuration value may be returned in response to the incoming user request. However, if the configuration value is not found, method 600 proceeds to step 618, which may include determining whether additional hierarchy levels exist in the application property scheme associated with the web application. If no more hierarchy levels exist, method 600 proceeds to step 620, in which a null value is returned (as in step 610), thereby indicating that no registered configuration value exists in the application property scheme for the specified property key. However, if any additional hierarchy levels exist, method 600 proceeds to step 622, which includes continuing to the next hierarchy level and then, repeating one or more of steps 612, 614, and 618 for the next hierarchy level.

To illustrate a practical example of method 600 using the application property scheme described previously with respect to look-up table 400 of FIG. 4, the request attributes container for a current incoming user request may include the following set of attributes: {BR=BR1; PA=SP1; CO=US}, where "BR" is the qualifier for the Brand property, "PA" is the qualifier for the Partner property, and "CO" is the qualifier for the Country property, as described previously. The request may also specify the following property key to be used to look-up the appropriate property configuration value corresponding to each request attribute: "sample.property.key.1." Once the request attributes are retrieved from the request attributes container identified for the current request (step 604), the property retrieval subsystem of the general property hierarchy system may determine if the property entries corresponding to these request attributes are registered in the application property scheme (step 606). Referring back to FIG. 4, this may include determining whether configuration values (e.g., resolver keys 410, property keys 420, and property values 430) corresponding to the request attributes exist in look-up table 400.

The property retrieval system may start the search using the property resolver (e.g., property resolver 502B of FIG. 5B, as described above) corresponding to the lowest hierarchy level, which in this example may be associated with the Brand-Partner property ("BR-PA"). As this hierarchy level is a combination of two request attributes, the corresponding resolver key may be represented using the following pattern: BR1_SP1. According to table 400, a registered entry can be found for the property map corresponding to resolver key BR1_SP1 and property key sample.property.key.1. The property configuration value (column 430) returned for this entry (step 616) in table 400 would be "PROPVALUE 41."

In another example, the request attributes container for another incoming user request may include the following set of attributes: {BR=BR1; PA=SP2; CO=US}. The specified property key in the request may be the same as in the previous example, i.e., "sample.property.key.1." As before, once the request attributes are retrieved from the request attributes container identified for the current request (step 604), the property retrieval subsystem of the general property hierarchy system may determine if the property entries corresponding to these request attributes are registered in the application property scheme (step 606). As described above, this may include determining whether configuration values (e.g., resolver keys 410, property keys 420, and property values 430) corresponding to the request attributes exist in look-up table 400.

Also, as before, the property retrieval system may start the search using the property resolver corresponding to the lowest hierarchy level, e.g., the level associated with the Brand-Partner property ("BR-PA"). The corresponding resolver key may be represented using the following pattern: BR1_SP2. According to table 400, no property map exists for resolver key BR1_SP2. As it may be determined that additional hierarchy levels exist (step 618), the property retrieval system continues to iteratively search for registered entries corresponding to each of the next hierarchy levels in the application property scheme (steps 622 to 612). This search may continue until either a property configuration value is found or no value is found, in which case a null value may be returned (step 620). Thus, the next hierarchy level may be PA and the resolver key is SP2. Although a property map exists for the resolver key SP2, there is no entry in table 400 that corresponds to property key sample.property.key.1. Accordingly, the search continues to the next hierarchy level, which in this example is CO with a resolver key of US (based on the corresponding request attribute). As before, a property map may be found for key US, but there is no entry in table 400 for property key sample.property.key.1. Therefore, the search continues to the next hierarchy level, which in this example is BR with a resolver key of BR1. This time, a registered entry in table 400 exists for the property map corresponding to resolver key BR1 and property key sample.property.key.1. According to table 400, the appropriate property configuration value (in column 430) to be returned for this entry (step 616) is "PROPVALUE 11."

Figure 7:
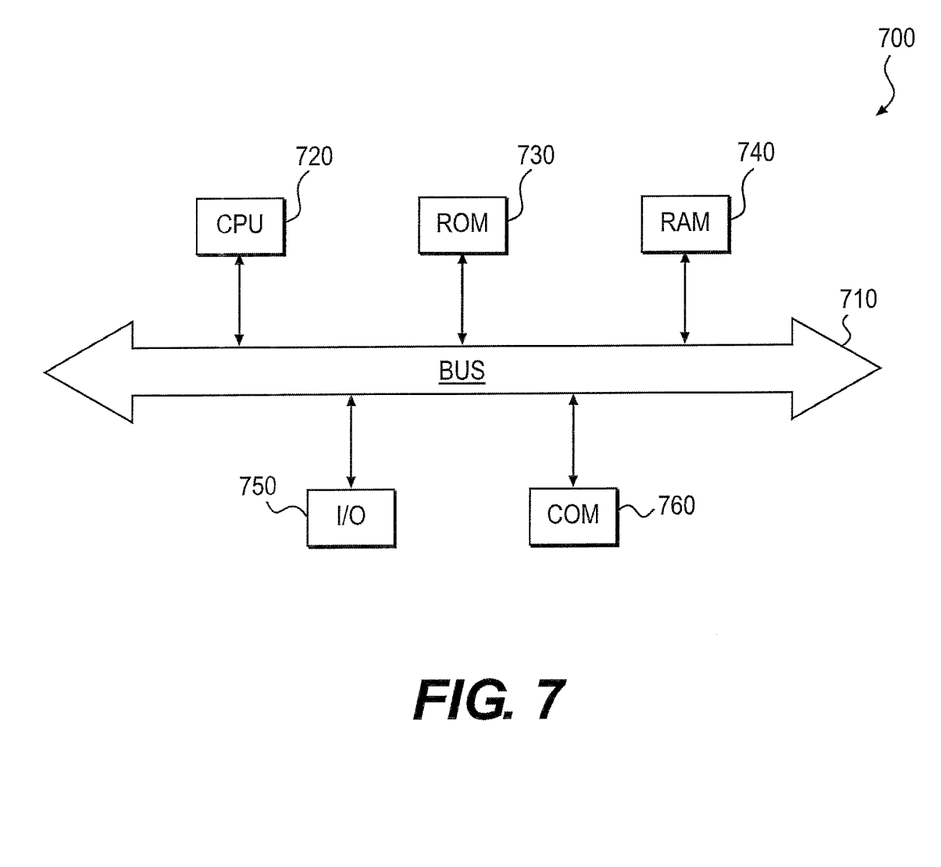
FIG. 7 is a block diagram of an exemplary computer or server system in which embodiments of the present disclosure may be implemented.

FIG. 7 is a block diagram of an exemplary computing system 700 in which embodiments of the present disclosure may be implemented. Computing system 700 may be included in one or more of the user devices 110a, 110b, 110c, management server 130, and/or application server 140, and configured to store and execute instructions for: (i) implementing one or more components of systems 200 and 300 of FIGS. 2 and 3, respectively; (ii) implementing the property system 500 including property resolvers of FIGS. 5A-5C, and (iii) performing the exemplary method of FIG. 6. In one embodiment, computing system 700 may include a data communication interface for packet data communication 760. The platform may also include a central processing unit (CPU) 720, in the form of one or more processors, for executing program instructions. The platform typically includes an internal communication bus 710, program storage and data storage for various data files to be processed and/or communicated by the platform such as ROM 730 and RAM 740, although the server 700 often receives programming and data via a communications network (not shown). The hardware elements, operating systems and programming languages of such equipment are conventional in nature, and it is presumed that those skilled in the art are adequately familiar therewith. The server 700 also may include input and output ports 750 to connect with input and output devices such as keyboards, mice, touchscreens, monitors, displays, etc. Of course, the various server functions may be implemented in a distributed fashion on a number of similar platforms, to distribute the processing load. Alternatively, the servers may be implemented by appropriate programming of one computer hardware platform.

Program aspects of the technology may be thought of as "products" or "articles of manufacture" typically in the form of executable code and/or associated data that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

The presently disclosed applications, methods, devices, and systems may advantageously improve configuring a web application based on a general property hierarchy. Specifically, the general property hierarchy system may be used to look up configuration values from the appropriate hierarchy level(s) of an application property scheme generated for the web application in order to configure one or more properties of the web application during its execution. The application property scheme may be generated based on values in one or more system configuration files. Any changes or updates to values in the system configuration file(s) may be reflected dynamically in the application property scheme without substantial interruption to the execution of the web application. Relative to conventional solutions, the general property hierarchy systems and methods disclosed herein provide application production management teams with greater flexibility and more options for configuring web applications for purposes of localization and internationalization of web application features for a wide range of delivery targets.

While the presently disclosed sharing application, methods, devices, and systems are described with exemplary reference to applications for mobile applications, it should be appreciated that the presently disclosed embodiments may be applicable to any environment, such as a desktop or laptop computer, an automobile entertainment system, a home entertainment system, etc. Also, as previously noted, the presently disclosed embodiments may be applicable to any type of content, such as text content or video content.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A computer-implemented method for configuring a web application based on a general property hierarchy, the method comprising:
   obtaining a system configuration file via a network;
   generating an application property scheme having one or more property hierarchy levels for configuring a web application during execution of the web application based on the obtained system configuration file, wherein the system configuration file defines configuration values for a plurality of properties at each of the one or more property hierarchy levels of the application property scheme;
   receiving a request for a configuration value associated with at least one of the plurality of properties;
   identifying request attributes related to at least one of the one or more property hierarchy levels based on the received request;
   searching for the configuration value at each of the one or more property hierarchy levels of the generated application property scheme based on the identified attributes for the request by iteratively performing the following steps:
      determining whether the configuration value is available at a first of the one or more property hierarchy levels of the generated application property scheme;
      searching for the configuration value at each successive property hierarchy level within the generated application property scheme based on the identified attributes for the request, when the configuration value is determined not to be available at the first hierarchy level; and
      setting the configuration value to a null value, when the configuration value from the request is not found in any of the one or more property hierarchy levels; and
   sending a response including the configuration value based on the search.

2. The method of claim 1, wherein each of the plurality of properties are mapped to one or more property keys associated with different configuration values, and the request specifies a property key for the configuration value that is requested.

3. The method of claim 1, further comprising:
   responsive to receiving an indication of a new configuration value for at least one of the plurality of properties defined in the system configuration file, dynamically updating the application property scheme based on the new configuration value.

4. The method of claim 1, wherein the identifying further comprises:
   adding the identified request attributes to a request attributes container that is associated with the received request and stored in a memory device accessible to the web application during execution.

5. The method of claim 1, wherein the received request is a web request originating from a website.

6. The method of claim 5, wherein the request attributes include one or more of a brand, a country, a language, and a partner associated with the website.

7. The method of claim 5, wherein the request attributes are identified based on an originating Internet Protocol (IP) address of the web request.

8. The method of claim 5, wherein the request attributes are identified based on a domain of the web request.

9. The method of claim 5, wherein the request attributes are identified based on a predefined parameter derived from the web request.

10. A system for configuring a web application based on a general property hierarchy, the system comprising:
    a memory having processor-readable instructions stored therein; and
    a processor configured to access the memory and execute the processor-readable instructions, which when executed by the processor configures the processor to perform a plurality of functions, including functions to:
    obtain a system configuration file via a network;

generate an application property scheme having one or more property hierarchy levels for configuring a web application during execution of the web application based on the obtained system configuration file, wherein the system configuration file defines configuration values for a plurality of properties at each of the one or more property hierarchy levels of the application property scheme;

receive a request for a configuration value associated with at least one of the plurality of properties;

identify request attributes related to at least one of the one or more property hierarchy levels based on the received request;

search for the configuration value at each of the one or more property hierarchy levels of the generated application property scheme based on the identified attributes for the request by iteratively performing the following steps:

determine whether the configuration value is available at a first of the one or more property hierarchy levels of the generated application property scheme;

search for the configuration value at each successive property hierarchy level within the generated application property scheme based on the identified attributes for the request, when the configuration value is determined not to be available at the first hierarchy level; and set the configuration value to a null value, when the configuration value from the request is not found in any of the one or more property hierarchy levels; and send a response including the configuration value based on the search.

11. The system of claim 10, wherein each of the plurality of properties are mapped to one or more property keys associated with different configuration values, and the request specifies a property key for the configuration value that is requested.

12. The system of claim 10, wherein the processor is further configured to perform functions to:

receive an indication of a new configuration value for at least one of the plurality of properties defined in the system configuration file; and responsive to the received indication, dynamically update the application property scheme based on the new configuration value.

13. The system of claim 10, wherein the identification function further comprises a function to:

add the identified request attributes to a request attributes container that is associated with the received request and stored in a memory device accessible to the web application during execution.

14. The system of claim 10, wherein the received request is a web request originating from a website, and the request attributes include one or more of a brand, a country, a language, and a partner associated with the website.

15. The system of claim 14, wherein the request attributes are identified based on an originating Internet Protocol (IP) address of the web request.

16. The system of claim 14, wherein the request attributes are identified based on a domain of the web request.

17. The system of claim 14, wherein the request attributes are identified based on a predefined parameter derived from the web request.

18. A non-transitory computer readable medium storing instructions that, when executed by a computer, cause the computer to perform functions to:

obtain a system configuration file via a network;

generate an application property scheme/object having one or more property hierarchy levels for configuring a web application during execution of the web application based on the obtained system configuration file, wherein the system configuration file defines configuration values for a plurality of properties at each of the one or more property hierarchy levels of the application property scheme;

receive a request for a configuration value associated with at least one of the plurality of properties;

identify request attributes related to at least one of the one or more property hierarchy levels based on the received request;

search for the configuration value at each of the one or more property hierarchy levels of the generated application property scheme based on the identified attributes for the request by iteratively performing the following steps:

determine whether the configuration value is available at a first of the one or more property hierarchy levels of the generated application property scheme;

search for the configuration value at each successive property hierarchy level within the generated application property scheme based on the identified attributes for the request, when the configuration value is determined not to be available at the first hierarchy level; and set the configuration value to a null value, when the configuration value from the request is not found in any of the one or more property hierarchy levels; and send a response including the configuration value based on the search.

19. The method of claim 1, wherein searching for the configuration value at each of the one or more property hierarchy levels of the generated application property scheme based on the identified attributes for the request, further comprises iteratively performing the following step:

returning the configuration value, when the configuration value from the request is found in any of the one or more property hierarchy levels.

* * * * *